United States Patent Office 3,243,280
Patented Mar. 29, 1966

3,243,280
METHOD OF REMOVING HYDROGEN FROM LIQUID ALKALI METALS
Edward G. Bohlmann, Concord, and Edgar L. Compere, Knoxville, Tenn., assignors to the United States of America as represented by the United States Atomic Energy Commission
No Drawing. Filed Mar. 15, 1965, Ser. No. 440,032
7 Claims. (Cl. 75—66)

Our invention relates to methods of removing impurities from the coolant systems of liquid metal-cooled nuclear reactors.

Liquid sodium, liquid potassium and mixtures thereof are useful as coolants in high temperature nuclear reactors. The reactors developed in the SNAP reactor program, such as SNAP-8 using the eutectic mixture of sodium and potassium (specified as NaK) as the primary coolant, are typical of these reactors. Problems arise in the use of liquid sodium and potassium as coolants when hydrogen enters the system. Hydrogen can enter the coolant system by leakage of aqueous or organic secondary coolants and by diffusion from moderator materials and metal hydride fuel. Hydrogen in the coolant can reach many parts of the reactor and can cause problems through bubble formation, hydride precipitation, and hydriding of structural materials. The SNAP-8 reactor employs clad uranium-zirconium hydride fuel elements cooled by NaK flowing through a primary loop, which in turn heats mercury which flows through a boiler, turbine and condenser. At the operating temperature for the NaK of 1100° to 1300° F., hydrogen passes into the NaK and is lost through the walls. A major portion of the hydrogen passes into the mercury system, and boiler operations will accumulate hydrogen in the condenser outlet where it will cause operating problems. These problems can be alleviated by reducing the partial pressure of hydrogen in the NaK from the normal level of $2 \times 10^{-5}$ atmosphere to $2 \times 10^{-9}$ atmosphere.

Methods considered for removing hydrogen include diffusion through high permeability portions of the system, cold trapping by passing the coolant through a zone maintained at a temperature low enough to precipitate sodium and potassium hydride, and sorption of hydrogen on solid materials. These methods have not been feasible for the following reasons: The diffusion method requires too extensive an area of high permeability to be practicable. The second method, cold trapping, requires a cold trap temperature approaching the freezing point of a sodium-potassium mixture which is detrimental to the thermal economy of the system and requires close temperature control to avoid freezing the cold trap shut. The method of removing hydrogen by sorption on solid materials is not practicable for this system since compatibility of the solids with sodium and potassium and the required surface-to-volume ratio introduces additional problems.

It is one object of our invention to provide an improved method of reducing the activity of hydrogen in a liquid alkali metal system.

It is another object to provide a method of removing hydrogen from the coolant system of a liquid alkali metal-cooled nuclear reactor.

It is still another object to reduce the hydrogen activity in a liquid alkali metal system without drastically reducing its temperature.

Other objects of our invention will be apparent from the following detailed description and the appended claims.

In accordance with our invention we have provided a method of reducing the activity of hydrogen in a liquid metal selected from liquid sodium, liquid potassium and mixtures thereof comprising the step of providing lithium in said liquid metal.

The presence of lithium even in a low concentration greatly reduces the activity of hydrogen in liquid sodium and potassium systems. Lithium readily combines with hydrogen in these systems preventing it from accumulating as a mass of gas or from forming hydride precipitates in undesired locations. By using our process hydrogen activity in a system containing hydrogen at a partial pressure even as low as approximately $10^{-9}$ atmosphere can be reduced.

Our method is useful in reducing the activity of hydrogen in pure sodium, pure potassium, or a mixture of these two metals in any proportion. In view of the wide temperature range over which it can be used the eutectic mixture of sodium and potassium is a desirable coolant and our method works well with this mixture.

In carrying out our method lithium metal is added to the coolant. While lithium having its natural isotopic concentration may be used in our method, in view of its lower thermal neutron capture cross-section, lithium enriched in $^7$Li is preferred.

The mere presence of lithium in the metal coolant reduces the activity of the hydrogen, but the greatest benefits are attained when major portions of the hydrogen are permanently removed from the liquid metal by precipitation and filtration of lithium hydride. The removal of hydrogen may be achieved by the use of conventional cold trap. Although the cold trap may be conventional, it may be operated at temperatures much closer to the main liquid temperature for equal effectiveness than would be the case if lithium were not added to the liquid alkali metal. The temperature drop desired in the cold trap depends upon system conditions and requirements such as the temperature of the main body of liquid, the lithium concentration, and the desired reduction in hydrogen activity, and may suitably range from 100° to 800° F.

The concentration of lithium and the temperature of the cold trap in which lithium hydride is removed control the extent of the reduction of hydrogen activity; lithium concentrations as low as 0.1 atomic percent are effective in providing a reduction in hydrogen activity. The amount of lithium added will ordinarily be determined by the characteristics of the specific reactor system under consideration since enough lithium should be provided to accommodate all the hydrogen which will come into the system. The lithium need not be added all at once, but provision may be made to add it incrementally during operation of the reactor to replace the lithium which combines with hydrogen. A concentration of lithium in the range of two to five percent is normally adequate.

Having thus described our invention the following examples are offered to illustrate it in detail. Example I shows the effect of cold trapping untreated NaK at the relatively high temperature of 600° F. Example II shows that the inclusion of a relatively small amount of lithium permits the achievement of a similar reduction in hydrogen activity at the appreciably higher temperature of 1100° F. Example III shows that the addition of larger quantities of lithium serves to increase the capacity of the system in controlling the hydrogen activity, and to lower the threshold for hydrogen removal.

*Example 1*

A portion of NaK which contains over 40 parts per million dissolved hydrogen is passed through a cold trap at 600° F. The resultant NaK contains approximately 40 parts per million hydrogen, and has a hydrogen activity at 1100° F. equivalent to a hydrogen partial pressure of 0.037 atmosphere.

Example II

Lithium is added to NaK to a concentration of 1.16 atomic percent lithium. Hydrogen is added to the mixture at 1100° F. and the solution filtered. As a hydrogen partial pressure of 0.037 atmosphere is reached, a halt in the hydrogen partial pressure results and a precipitate of lithium hydride can be filtered. The solution contains 51 parts per million hydrogen. As more hydrogen is added, lithium hydride precipitation removes lithium from the solution, and there is a relatively gradual increase in hydrogen partial pressure.

As can be seen from Examples I and II, lithium reduces the activity of hydrogen even without cold trapping, and in the absence of lithium cold trapping from 1100° F. to about 600° F. is required to reduce the hydrogen activity to the same level as is achieved by the addition of a small quantity of lithium and no cold trapping.

Example III

Lithium is added to NaK to a concentration of 2.15 atomic percent lithium. Hydrogen is added to the mixture at 1100° F. until a hydrogen partial pressure of 0.037 atmosphere is reached. It is found that considerable lithium hydride has been precipitated. The total amount of hydrogen added corresponds to a hydrogen concentration of 306 p.p.m. Had the lithium not been present, all the hydrogen would have been dissolved, and the associated hydrogen partial pressure would have been 2.1 atmospheres.

At earlier stages of the precipitation of lithium hydride from this solution, the hydrogen partial pressures were considerably below 0.037 atmosphere. It is estimated that the precipitation actually begins for this solution at a pressure of approximately 0.010 atmosphere.

Example IV shows the cold trapping conditions necessary to reduce the hydrogen content of untreated SNAP–8 coolant to desired levels and Example V shows the advantages of using our invention to obtain more practical cold trapping conditions.

These examples are based on the SNAP–8 system. In this system the primary coolant, eutectic sodium potassium mixture (NaK), flows through an active fuel portion consisting of clad uranium zirconium hydride. The coolant circulates through a heat exchanger where the temperature is dropped from 1300° to 1100° F. Hydrogen passes into the coolant from the fuel and diffuses outwardly through the walls of the primary system. The resulting steady state hydrogen partial pressure in the coolant is $2 \times 10^{-5}$ atmosphere.

Example IV

A portion of the circulating NaK is passed through a cold trap to precipitate and remove NaK hydride. At trap temperatures of about 300°–400° F., no NaK hydride is removed, the partial pressure of hydrogen at 1100° F. remaining at about $2 \times 10^{-5}$ atmosphere. NaK hydride is not formed and removed at a rate sufficient to reduce the partial pressure of hydrogen to the desired level of $2 \times 10^{-9}$ atmosphere until a cold trap temperature of about 100° F. is reached. As can be seen from this example hydrogen can be reduced to an acceptable level only by a low cold trap temperature.

Example V

Lithium in an amount sufficient to provide a concentration of about 4 atomic percent is added to the system of Example IV. The partial pressure of hydrogen at a temperature of 1100° F. is $2 \times 10^{-5}$ atmosphere. The desired hydrogen partial pressure of $2 \times 10^{-9}$ (at 1100° F.) is reached by passing the solution through a cold trap at a temperature of about 365° F. As can be seen from this example, the addition of lithium permits the removal of hydrogen at a conveniently attainable cold trap temperature.

The above examples are intended to illustrate, not to limit, our invention. It is obvious that the addition of lithium to any sodium or potassium system will reduce the activity of hydrogen in such a system.

Having thus described our invention, we claim:

1. A method of reducing the hydrogen activity in a system containing hydrogen and a liquid metal selected from liquid sodium, liquid potassium and mixtures thereof, comprising providing lithium in said liquid metal in a concentration effective to reduce the partial pressure of hydrogen in said system.

2. The method of claim 1 wherein said lithium is provided in a concentration of at least 0.1 atomic percent.

3. The method of claim 1 wherein said lithium is provided in a concentration of 2 to 5 atomic percent.

4. A method of removing hydrogen from a liquid metal selected from liquid sodium, liquid potassium, and mixtures thereof containing hydrogen comprising providing lithium in said liquid metal in a concentration high enough to form lithium hydride, circulating a portion of the resulting lithium hydride-containing liquid metal through a zone having a temperature lower than the main body of liquid metal whereby solid lithium hydride is formed, and separating said solid lithium hydride from the cooled liquid.

5. The method of claim 4 wherein the lithium is provided in the liquid metal in a concentration of at least 0.1 atomic percent.

6. The process of claim 4 wherein the lithium is provided in the liquid metal in a concentration of 2 to 5 atomic percent.

7. The process of claim 4 wherein the lithium hydride solids are formed by cooling the liquid metal to a temperature about 100° to 800° cooler than the main body of liquid metal.

References Cited by the Examiner

UNITED STATES PATENTS 2,879,157   3/1959   Batutis et al. _____ 75—66

OTHER REFERENCES

Hampel: Rare Metals Handbook, 2nd Edition, 1961, Printed Publish Co., New York, pages 256 and 257.

BENJAMIN R. PADGETT, *Acting Primary Examiner.*

L. DEWAYNE RUTLEDGE, *Examiner.*